FUNCTIONAL GENERATOR

FUNCTIONAL GENERATOR

INVENTOR.
Takeo Miura
Norio Yokozawa
BY Junzo Iwata

Wenderoth & Wenderoth

INVENTOR.
Takeo Miura
Norio Yokozawa
Junzo Iwata
BY
Meston & Meston

United States Patent Office 3,358,130

Patented Dec. 12, 1967

3,358,130
FUNCTION GENERATOR

Takeo Miura, Kitatama-gun, Tokyo-to, Norio Yokozawa, Setagaya-ku, Tokyo-to, and Junzo Iwata, Kodaira-shi, Japan, assignors to Kabushiki Kaisha Hitachi Seisakusho, Tokyo-to, Japan, a joint-stock company of Japan Filed Feb. 5, 1964, Ser. No. 342,709
Claims priority, application Japan, Feb. 9, 1963, 38/6,698
2 Claims. (Cl. 235—197)

ABSTRACT OF THE DISCLOSURE

A function generator constructed so that X- and Y-coordinates of respective break-points of a function form to be formed by a plurality of linear segments are first established; then a signal resulting from superimposition of an oscillation waveform on a constant direct current is generated so as to calculate out a signal corresponding to an output of a function generator, in case the input signal and the function form of the linear segment approximation function generator are accurately established from the above-mentioned X- and Y-coordinates, and the break point and slope of the linear segment in the above-mentioned function generator are adjusted in such a manner that the difference between the above calculated signal and the actual output signal of the function generator corresponding to the above-mentioned input signal becomes zero.

This invention relates to apparatuses such as analog computers, and more particularly to a new and improved function generator having highly advantageous for use in the said apparatuses.

The function generator of this invention is constructed of the following components so as to attain the intended purpose, i.e., a linear segment approximation function generator, voltage dividers to produce electrical signals which are proportional to the X- and Y-coordinates of the break points of the function form formed by a plurality of linear segments, a setting device to set the dividing ratios of said voltage dividers in accordance with the function form, a signal generator to generate a signal resulting from superimposition of an oscillation waveform on a constant direct current, an additional circuit to add the output of said signal generator to said electrical signal to be proportional to the X-coordinate and to apply an additional output resulting from this addition to said function generator, an operational circuit to calculate an additional signal resulting from an addition of said Y-coordinate, and the product of the output of said signal generator, and the slope of said linear segment, a subtractor to obtain the difference signal between the output of said function generator and the output of said operational circuit, and adjusting means to adjust the break points and slopes of the linear segments in said function generator in order to cause said difference signal to become zero. Furthermore, according to the invention, when the above adjusting means is made by automatic operations, it is constructed of the following components: a first servo-mechanism to adjust the break points of the linear segments in order to cause the D-C component of the output of the subtractor to become zero, a second servomechanism to adjust the slopes of the linear segments in order to cause the A-C component of the output of the subtractor to become zero, first clutch means to couple the potentiometers of said function generator for adjusting said break point to said first servomechanism and a second clutch means to couple the potentiometer of said function generator for adjusting said slopes to said second servomechanism.

The nature, principles, and details of the invention, as well as its specific objects, will be best understood by reference to the following description, taken in conjunction with the accompanying drawings in which like parts are designated by like reference characters, and in which.

For facility in understanding the specific nature and utility of the present invention, particularly with respect to its analytical aspects, the following brief consideration of function generators in general and problems encountered in their design is believed to be necessary.

In an analog computer, in general, a device to generate a voltage which is an arbitrary function $f(e_i)$ with respect to an input voltage $e_i$, that is, a function generator, is used. Various types of function generators have been proposed and developed. Of these, the function generator of linear segment approximation type which utilizes the non-linear characteristic of a diode is simple and is widely used. Examples of this type of function generator are shown in FIGS. 1 and 2.

Figure 1:
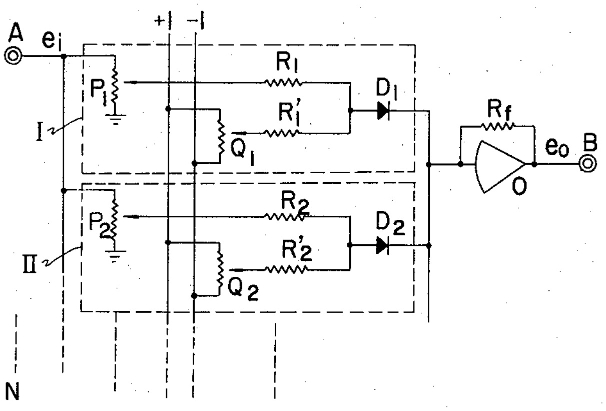
FIGS. 1 and 2 are schematic diagrams indicating the prinicples of two examples of diode function generators.
Figure 2:
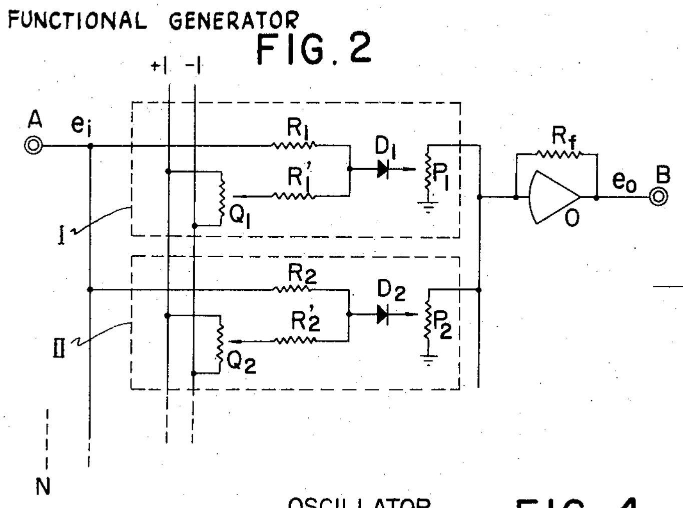

In each of FIGS. 1 and 2, an input $e_i$ is applied to an input terminal A of a circuit which comprises, essentially, voltage dividers $Q_1$, $Q_2$ . . . for biasing, input resistances $R_1$, $R_2$ . . . and $R_1'$, $R_2'$ . . . diodes $D_1$, $D_2$ . . . potentiometers $P_1$, $P_2$ . . . for controlling the slopes of segments, a high-gain operational amplifier O, a feedback resistance $R_f$, and an output terminal B at which an output voltage $e_0$ is produced.

Figure 3:
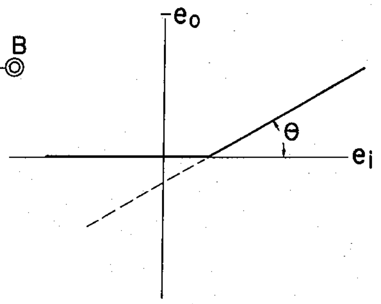
FIG. 3 is a graphical representation indicating the input-output characteristic of a diode function generator such as those shown in FIGS. 1 and 2.

When the block I enclosed by the dotted line in each of these circuits is considered in the case when the diode $D_1$ does not exist, and the dividing ratios of the potentiometers $P_1$ and $Q_1$ are respectively denoted by $\lambda_1$ and $\mu_1$, the output produced (straight line including the dotted line in FIG. 3) may be represented by the following equations.

In the case of the circuit shown in FIG. 1, $$-e_0=R_f\left(\frac{\lambda_1 e_i}{R_1}+\frac{\mu_1}{R_1'}\right) \quad (1)$$

In the case of the circuit shown in FIG. 2, $$-e_0=R_f\left(\frac{\lambda_1 e_i}{R_1}+\frac{\lambda_1\mu_1}{R_1'}\right) \quad (1')$$

However, since the diode $D_1$ exists, an output is produced only in the case when the terms on the righthand sides of the above Equations 1 and 1' are positive. In the case when these terms are negative, the output becomes zero because of the rectifying characteristic of the diode, and the characteristic becomes that as indicated by the full line in FIG. 3. In either case, variation of the dividing ratio of the potentiometer $P_1$ causes the slope $\theta$ of the straight line to vary, and variation of the dividing ratio of the potentiometer $Q_1$ causes parallel shifting of the straight line in the horizontal direction.

In each circuit, blocks I, II, . . . N, each having the operational characteristic as described above, are provided, and a function form which results from the summation of the segments produced by these blocks is obtained from the output terminal B. However, a function form is determined, for example, by the X-coordinates and Y-coordinates of several break points, and suitable adjustment of the positions of said points so as to set a given function form requires a considerable amount of tedious labor.

It is an object of the present invention to provide a function generator whereby it is possible to carry out such setting operation in a simple manner.

It is a further object of the invention to provide a function generator wherein, through the use of a device to select one predetermined potentiometer from among several potentiometers and a device to set automatically the dividing ratios of potentiometers, function setting can be carried out fully automatically if the positions of the respective break points are indicated by means such as push-buttons or punched tape.

Figure 4:
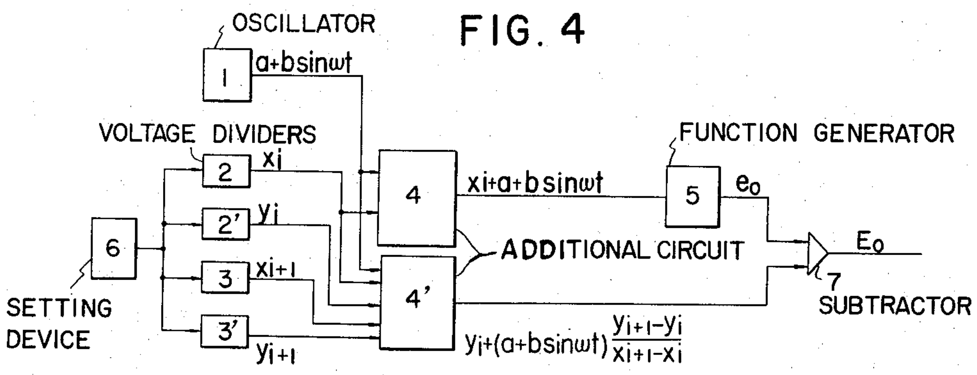
FIG. 4 is a block diagram indicating the composition and arrangement of a preferred embodiment of the function generator according to the invention.

The nature and details of the invention will be further apparent from the following detailed description of a preferred embodiment thereof as shown in FIG. 4. In the function generator illustrated in FIG. 4, there is provided an oscillator 1 (sine wave or rectangular wave) producing an oscillatory wave (as one example: $b \sin \omega t$) superimposed on a constant direct-current component $a$ (where $b<a$). The function form to be generated is electrically read by a setting device 6 which operates to set the dividing ratios of voltage dividers 2, 2′, 3, and 3′ in accordance with the function form so read. The voltage dividers 2, 2′, 3, and 3′ produce electrical signals which are proportional to the X and Y coordinates of the break point of the function form to be set, and the setting operation is accomplished by means such as a relay circuit which operates according to instruction read from a punch tape or by means such as a push-button. A device for carrying out such setting operations has been described, e.g., in "Analog Computation," Vol. 1, 1961, pp. 83–85, by Stanley Fifer, Ph. D., McGraw-Hill Book Company, Inc.

The output signal $(a+b \sin \omega t)$ of the aforesaid oscillator 1 and the output $x_i$ of the voltage divider 2 are added by an additional circuit 4, and an additional circuit 4′ receives as an input the outputs $x_i$, $y_i$, $x_{i+1}$, and $y_{i+1}$ of the aforementioned voltage dividers and the output $(a+b \sin \omega t)$ of the oscillator 1 and produces as an output a signal which is $$y_i+(a+b \sin \omega t)\times\frac{y_{i+1}-y_i}{x_{i+1}-x_i}$$

Figure 5:
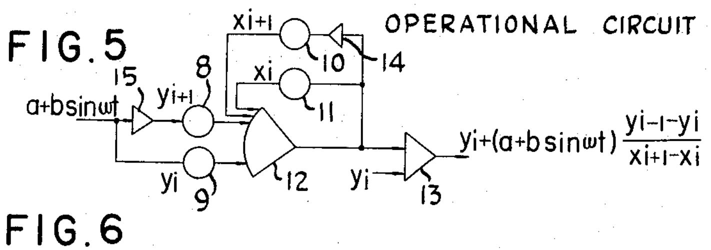
FIG. 5 is a fragmentary diagram indicating the details of one part of the function generator shown in FIG. 4.

One example of this additional circuit 4′ is shown in FIG. 5. Therein, the reference numerals 8–11 denote the voltage dividers whose dividing ratio is set by the above-mentioned setting device 6 so as to generate electrical signals which are proportional to X- and Y-coordinates of the break point of the function form to be set. That is, in this case, the above-mentioned voltage dividers 8 through 11 are further provided, in addition to the voltage dividers 2 and 2′ as in the above-described FIG. 4, and the voltage dividers 9 and 11 are disposed in parallel with the voltage dividers 2 and 2′ by the setting device 6. The voltage dividers 3 and 3′ are not particularly necessary to be provided, since the voltage dividers 8 and 10 are provided. It goes without saying that the voltage dividers 2, 2′, 3 and 3′ arranged as shown in FIG. 4 may become necessary, if and when other circuit construction than that shown in FIG. 5 is adopted. This is merely a problem in circuit designing and can easily be done by skilled artisans as a case necessitates, hence it has no direct pertinence to the essential subject matter of the invention. The reference numeral 12 shows an operational amplifier, 13 is an adder, and 14 and 15 are sign changers.

Now, assume that the gain of the operational amplifier 12 is sufficiently large (this is a condition which is always established in an operational amplifier. See the above-mentioned literature, if necessary), and there is a relationship of $x_i> x_{i+1}> {}_0$. In this case, the output $e_0$ of the operational amplifier takes a value to render the summation of the input to be zero, and the amplifier becomes stable, as represented by the following equation.

$$(a+b \sin \omega t)(y_i-y_{i+1})+e_0(x_i-x_i-x_{i+1})=0$$

$$e_0=(a+b \sin \omega t)\frac{y_i-y_{i+1}}{x_i-x_{i+1}}$$

Accordingly, at the terminal of the adder 13, an output having the value represented by the following equation can be obtained.

$$e_0+y_i=y_i+(a+b \sin \omega t)\frac{y_i-y_{i-1}}{x_{i+1}-x_i}$$

Figure 8:
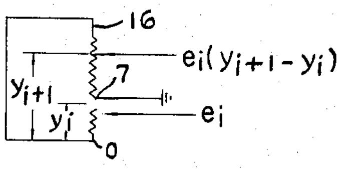
FIG. 8 is a fragmentary diagram indicating a modification of one part of the arrangement shown in FIG. 5.

In the case of relationship of $x_i{}^+{}_1>x_i>0$, the dividing ratio of the voltage divider 10 is set at $x_i$ and of the voltage divider 11 at $x_i{}^+{}_1$. Also when $x_ix_i{}^+{}_1<0$, the dividing ratios of the voltage dividers can be same as those of the case of $x_i>x_i{}^+{}_1>0$, although the absolute values of $x_i{}^+{}_1$ and $x_i$ may simply be established. (In the literature "Analog Computation," vol. II, 1961, McGraw-Hill Book Company, Inc., pages 833–838, there is described a technical discussion similar to the above-mentioned matter.) In this case, by using this circuit in actual practice, the addition $(y_{i+}e_o)$ can be carried by utilizing the amplifier of the succeeding stage without particularly providing the aforementioned adder 13. Furthermore, a term such as $y_{i+1}-y_i$ can also be obtained by means of a resistance network as is shown in FIG. 8. In this figure, a resistor 16 is connected at its both ends together in a ring shape (the total resistance value thereof is assumed to be 1). Now, this resistor 16 is cut at an appropriate position distant by $y_i$ from the standard position 0, the one end of the cut portion 17 being applied with an input $e_i$, and the other being grounded, so that an output may be taken out from this $y_i$, position distant from the abovementioned standard position. In this manner, it is possible to obtain an output of $e_i(y_{i+1}-y_i)$ since the resistance value from the input $e_i$ to the grounded point is 1 and that from the output point to the grounded point is $y_{i+1}-y_i$. It will be clear that this type of the resistor 16 can be used in place of the voltage dividers and the sign changers as shown in FIG. 5.

Figure 6:
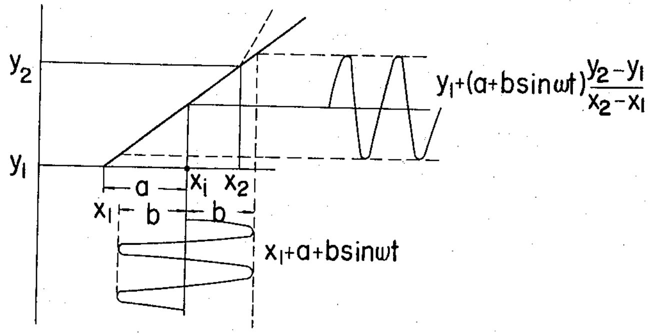
FIG. 6 is a graphical representation indicating a function form to be set and the input-output characteristic for setting.

Referring again to FIG. 4, the output signals $(x_i+a+b \sin \omega t)$, of the circuit 4 is applied to a function generator 5 such as that indicated in FIG. 1 or FIG. 2. The output $e_0$ of the function generator 5 and the output $$\left(y_i+(a+b \sin \omega t)\frac{y_{i+1}-y_i}{x_{i+1}-x_i}\right)$$

of the additional circuit 4′ are led to a subtractor 7, by which a signal $E_0$ which is the difference of the two said outputs is obtained. If, in the function generator 5, the outputs of the potentiometers $Q_1$, $Q_2$, . . . $Q_N$ for respective biasing within the blocks I, II, . . . N are caused to assume amply large negative values so that the diodes $D_1$, $D_2$, . . . $D_N$ will not be conductive within the range of the input signal (or if the input is cut off from the amplifier O); no output will be produced by the function generator 5. When the diode $D_1$ alone is rendered conductive and two coordinates $(x_1y_1)$ and $x_2y_2)$ are set in the voltage dividers 2, 2′, 3 and 3′ (in the case of using the operational circuit shown in FIG. 5, the voltage dividers 2, 2′ and 8 through 11 are used), an oscillation waveform expressable as $(x_1+a+b \sin \omega t)$ enters the function generator 5, and another oscillation waveform expressable as $$\left[y_1+(a+b \sin \omega t)\frac{Y_2-Y_1}{X_2-X_1}\right]$$

is produced by the operational amplifier 4′

$$(X_1+a+b \sin \omega t)$$

represents an input signal which, as shown in FIG. 6, varies with an amplitude $b$ toward each side of an axis at the value $x'$ which is greater by $a$ than the value of $x_1$ of the input of the break point. On the other hand, $$y_1+(a+b \sin \omega t)\frac{Y_2-Y_1}{X_2-X_1}$$

is equal to the output of block I of the function generator 5 in the case when $(X+a+b \sin \omega t)$ is introduced into the function generator 5, the block I of which is correctly set. Accordingly, when the potentiometers $P_1$ and $Q_1$ in the function generator 5 are set so as not to cause differences between the output of the operational circuit 4 and the output of the fusction generator 5, the function form (linear segment) between the first break point $(X_1, Y_1)$ and the second break poing $(X_2, Y_2)$ is correctly set. (This difference is the output $E_0$ of the subtractor 7. This subtractor 7 has been known conventionally, and is generally represented in the form of a circuit to sum up both positive asd negative inputs as shown in the aforementioned literature "Analog Computation," vol. 1, page 162.)

In order to cause the said difference to be zero, the potentiometer $P_1$ for slope is so adjusted that the alternating-current component of the difference output becomes zero, and the potentiometer $Q_1$ for biasing is so adjusted that the direct-current component becomes zero. Upon completion of these adjustments, in order to carry out the succeeding setting, $x_2$, $y_2$ and $x_3$, $y_3$ are set in the voltage dividers 2, 2′ and 3, 3′, and the same adjustment procedure is followed with the potentiometers $P_2$ and $Q_2$ of the function generator. This procedure is repeated to the final break point, N, whereupon the desired function form is set.

The foregoing description indicates the principle of the invention. In an actual apparatus, a sign changer for causing the slope to become negative and a circuit without diodes for only bias for causing the entire function form to move up and down in the $y$ direction become necessary. Furthermore, it becomes necessary to provide means to cause the value of $a$ or the value of $b$ to be variable in accordance with the function form to be set. Thus, a number of auxiliary facilities becomes necessary. In the case wherein the setting of the potentiometers $P_1, P_2, \ldots P_N$ and $Q_1, Q_2, \ldots Q_N$ is to be carried out manually, such a method as applying the output of the subtractor 7, for example, to the Y-axis of a cathode-ray tube and carrying out the operation by oscillating the X-axis thereof with sin $\omega t$ while observing the resulting pattern may be adopted. However, in the case wherein these potentiometers $P_1, P_2, \ldots P_N$ and $Q_1, Q_2 \ldots Q_N$ are set by automatic setting means such as servo-mechanisms, it is possible to set the function form in a fully automatic manner by providing automatic setting of potentiometers and providing indication of the $x$ and $y$ coordinates of the break point through the use of push buttons, the reading of a punch tape or a punch card, or the output from a digital computer.

Figure 7:
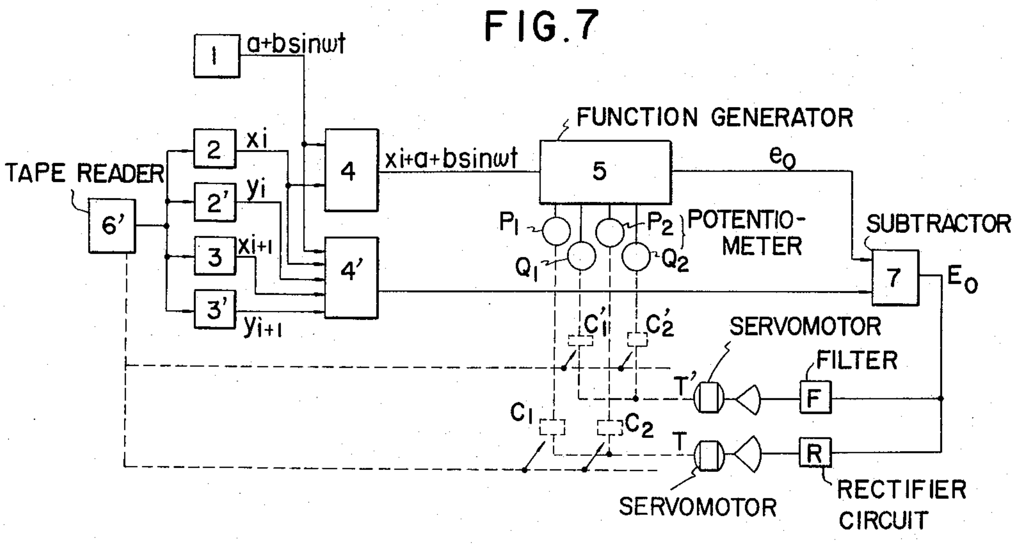
FIG. 7 is a block diagram indicating automatic function form setting operation and means.

An example of setting by means of a punch tape is indicated in FIG. 7. A tape reader 6 reads the values of break point coordinates $x_i$, $y_i$, $x_{i+1}$, $y_{i+1}$ and sets the same by means of relay circuits in voltage dividers 2, 2′, 3, and 3′ in the case of using the operational circuit shown in FIG. 5, the voltage dividers 2, 2′ and 8–11 and potentiometers $P_i$ and $Q_i$ ($i$=1, 2, . . . N) are coupled to the output shafts of servomotors T and T′ by clutches $c_i$ and $c_i'$. The servomotor T′ of the potentiometer $Q_i$ is driven by the D-C component taken out by a filter F from the output $E_0$ of the subtractor 7, and the servomotor T of the potentiometer $P_i$ is driven by the power resulting from synchronous rectification by a rectifier circuit R of the A-C component of the output of the subtractor 7. These servomechanisms adjust the dividing ratio of the abovementioned potentiometers $P_i$ and $Q_0$ so as to cause the A.C. and D.C. components of the output of subtractor 7 to become zero. Then, after a certain predetermined time, or when both the A-C component and D-C component of the output of the subtractor 7 become less than a certain value, the clutches $c_i$ and $c_i'$ shift to the succeeding operation, and the tape reader 6 reads the values of the succeeding break point and carries out the succeeding setting. The operation proceeds in this manner until the final setting is accomplished.

Since, after setting of $x_i$, $y_i$, $x_{i+1}$, and $y_{i+1}$ in the voltage dividers 2, 2′, 3, and 3′ and completion of the setting of the potentiometers, $x_{i+1}$, $y_{i+1}$, $x_{i+2}$, and $y_{i+2}$ are next set, it is convenient to use the voltage dividers 2, 2′, 3, and 3′ by alternately switching the outputs of 2, 2′ and 3, 3′.

In the case wherein a large number of function generators according to the present invention are used in combination, since a large part of the apparatus can be used commonly for all of the said function generators, the present invention is particularly applicable to cases such as that wherein it is desired to include a large number of function generators in a single computer.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A function generator comprising: a linear segment approximation function generator; voltage dividers to produce electrical signals which are proportional to the X- and Y-coordinates of the break points of the function form formed by a plurality of linear segments; a setting device to set the dividing ratios of said voltage dividers in accordance with the function form; a signal generator to generate a signal resulting from superimposition of an oscillation waveform on a constant direct current; an additional circuit to add the output of said signal generator to said electrical signal to be proportional to the X-coordinate and to apply an additional output resulting from this addition to said function generator; an operational circuit to calculate an additional signal resulting from addition of said Y-coordinate, and the product of the output of said signal generator and the slope of said linear segment; a subtractor to obtain the difference signal between the output of said function generator and the output of said operational circuit; and an adjusting means to adjust the break points and slopes of the linear segments in said function generator in order to cause said difference signal to become zero.

2. The function generator according to claim 1, wherein said adjusting means is constructed by a first servomechanism to adjust the break points of the linear segments in order to cause the D.C. component of the output of the subtractor to become zero; a second servomechanism to adjust the slopes of the linear segments in order to cause the A.C. component of the output of the subtractor to become zero; a first clutch means to couple potentiometers of said function generator for adjusting said break point to said first servomechanism and a second clutch means to couple potentiometers of said function generator for adjusting said slopes to said second servomechanism.

References Cited

UNITED STATES PATENTS

| | | | |
|---|---|---|---|
| 3,066,251 | 11/1962 | Losher | 235—197 |
| 3,191,017 | 6/1965 | Miura et al. | 235—197 |

MALCOLM A. MORRISON, *Primary Examiner.*

J. RUGGIERO, *Assistant Examiner.*